United States Patent [19]

Segal et al.

[11] Patent Number: 5,588,151
[45] Date of Patent: Dec. 24, 1996

[54] APPARATUS AND METHOD FOR COMMUNICATION SWITCHING INCLUDING PROVIDING INFORMATION OVERFLOW INDICATIONS

[75] Inventors: Jacob Segal, Ra'Anana; Josef Ben-Moshe, Holon; Zvika Weinstock, Petach Tikva; Zvika Harnik, Rishon Lezion, all of Israel

[73] Assignee: Lannet Data Communications Ltd., Tel Aviv

[21] Appl. No.: 525,500

[22] Filed: Sep. 8, 1995

Related U.S. Application Data

[63] Continuation of Ser. No. 217,328, Mar. 24, 1994, abandoned.

[30] Foreign Application Priority Data

Jan. 31, 1994 [IL] Israel .................................... 108505

[51] Int. Cl.⁶ .................................................. G06F 13/00
[52] U.S. Cl. ................... 395/800; 395/200.13; 395/500; 364/DIG. 1; 364/264; 364/264.3; 364/242.94; 364/239; 364/232.3
[58] Field of Search ........................... 395/800, 200, 395/370.6, 500, 200.21, 200.13; 370/60, 44.1

[56] References Cited

U.S. PATENT DOCUMENTS

| | | | |
|---|---|---|---|
| 4,996,684 | 2/1991 | Morley et al. | 375/108 |
| 5,121,387 | 6/1992 | Gerhardt et al. | 370/94.1 |
| 5,189,665 | 2/1993 | Niehaus et al. | 370/58.2 |
| 5,189,668 | 2/1993 | Takatori et al. | 370/60 |
| 5,226,120 | 7/1993 | Brown et al. | 395/200 |
| 5,231,631 | 7/1993 | Buhrke et al. | 370/60 |
| 5,237,566 | 8/1993 | Brand et al. | 370/61 |
| 5,237,670 | 8/1993 | Wakerly | 395/425 |
| 5,239,538 | 8/1993 | Teel, Jr. et al. | 370/58.3 |
| 5,274,631 | 12/1993 | Bhardwag | 370/60 |
| 5,283,788 | 2/1994 | Morita et al. | 370/110.1 |
| 5,287,535 | 2/1994 | Sakagawa et al. | 370/60 |
| 5,301,303 | 4/1994 | Abraham et al. | 395/500 |
| 5,319,644 | 6/1994 | Liang | 370/85.5 |
| 5,355,453 | 10/1994 | Row et al. | 395/200 |
| 5,400,329 | 3/1995 | Tokura et al. | 370/84 |
| 5,434,861 | 7/1995 | Pritty et al. | 370/85.8 |

OTHER PUBLICATIONS

"Novell Application Performance Testing" Synernetics Performance Networking, Aug. 25, 1993.
"A Depth Look at Three Switching Hubs" Translated reprint of Telecoms & Reseaux, No. 69, Sep. 1993, IDG Communications, France.
"The Switching Advantage", Kalpana EtherSwitch Publication Fall, 1991.
Axner, David H. "Evaluating Switching Hub Architectures" Business Communications Review, Jul. 1993, pp. 35–39.

*Primary Examiner*—Mehmet B. Geckil
*Attorney, Agent, or Firm*—Ladas & Parry

[57] ABSTRACT

Communication switching apparatus for providing communication between a multiplicity of digital information processors, the apparatus including a plurality of ports each communicating with at least one of the multiplicity of digital information processors, and a port interconnector operative to provide communication between more than one pair of ports from among the plurality of ports, characterized in that, when an overflow of information is caused at the port interconnector or at one of the plurality of ports, an overflow indication is provided to the digital information processors which communicate with the port interconnector or with the overflowed one of the plurality of ports.

12 Claims, 6 Drawing Sheets

APPARATUS AND METHOD FOR COMMUNICATION SWITCHING INCLUDING PROVIDING INFORMATION OVERFLOW INDICATIONS

This is a continuation of application Ser. No. 08/217,328 filed on Mar. 24, 1994, abandoned.

FIELD OF THE INVENTION

The present invention relates to switching systems.

BACKGROUND OF THE INVENTION

State of the art switching systems are described in the following publications:

"An In-Depth Look at Three Switching Hubs", (Translated reprint of) Telecoms & Reseaux, No. 69, September, 1993, IDG Communications, France;

"The Switching Advantage", Kalpana EtherSwitch Publication, Fall, 1991;

Axner, David H., "Evaluating Switching Hub Architectures", Business Communications Review, July 1993, pp. 35–39; and "Novell Application Performance Testing", Synernetics Performance Networking, Aug. 25, 1993.

SUMMARY OF THE INVENTION

The present invention seeks to provide an improved switching system and methods for using the same.

There is thus provided in accordance with a preferred embodiment of the present invention communication switching apparatus for providing communication between a multiplicity of digital information processors, the apparatus including a plurality of ports each communicating with at least one of the multiplicity of digital information processors, and a port interconnector operative to provide communication between more than one pair of ports from among the plurality of ports, characterized in that, when an overflow of information is caused at the port interconnector or at one of the plurality of ports, an overflow indication is provided to the digital information processors which communicate with the port interconnector or with the overflowed one of the plurality of ports.

Further in accordance with a preferred embodiment of the present invention each individual port includes an information overflow sensor and indicator operative to sense an overflow arriving from an individual digital information processor communicating therewith and to provide an overflow indication to the digital information processors communicating with the individual port.

Still further in accordance with a preferred embodiment of the present invention the port interconnector includes an information overflow sensor and indicator operative to sense an overflow arriving from an individual digital information processor and to provide an overflow indication to the digital information processors associated with the port interconnector.

Additionally in accordance with a preferred embodiment of the present invention each digital information processor is operative to refrain from transmitting information when it encounters a traffic congestion symptom and wherein the overflow indication includes an artificially generated occurrence of the traffic congestion symptom.

Also in accordance with a preferred embodiment of the present invention the communication provided includes LAN communication.

Further in accordance with a preferred embodiment of the present invention the multiplicity of processors includes at least one printer.

Still further in accordance with a preferred embodiment of the present invention the multiplicity of processors includes at least one workstation.

Additionally in accordance with a preferred embodiment of the present invention the multiplicity of processors includes at least one computer.

BRIEF DESCRIPTION OF THE DRAWINGS

The present invention will be understood and appreciated from the following detailed description, taken in conjunction with the drawings in which.

Attached herewith are the following appendices which are useful in generating a communication switching module which is constructed and operative in accordance with a preferred embodiment of the invention shown and described herein:

Appendices 1–5 are program listings which relate to a first LSI Logic ASIC (application specific integrated circuit) chip netlist which is useful in constructing communication switching apparatus constructed and operative in accordance with a preferred embodiment of the present invention. Specifically, Appendix 1 includes computerized starting information useful for setting up a working environment of LSI Logic tools;

Appendix 2 is the netlist itself according to which the chip layout may be generated;

Appendix 3 is RAM generating information;

Appendix 4 is a listing of test vectors useful in verifying the operation of the chip; and Appendix 5 is layout information indicating a preliminary placing of the elements of the ASIC chip.

Appendices 6–9 are program listings which relate to a second LSI Logic ASIC chip netlist which is useful in constructing communication switching apparatus constructed and operative in accordance with a preferred embodiment of the present invention. Specifically, Appendix 6 includes computerized starting information useful for setting up a working environment of LSI Logic tools;

Appendix 7 is the netlist itself according to which the chip layout may be generated;

Appendix 8 is a listing of test vectors useful in verifying the operation of the chip; and Appendix 9 is layout information indicating a preliminary placing of the elements of the ASIC chip.

Appendices 10–13 are program listings which relate to a third LSI Logic ASIC (application specific integrated circuit) chip netlist which is useful in constructing communication switching apparatus constructed and operative in accordance with a preferred embodiment of the present invention. Specifically, Appendix 10 includes computerized starting information useful for setting up a working environment of LSI Logic tools;

Appendix 11 is the netlist itself according to which the chip layout may be generated;

Appendix 12 is a listing of test vectors useful in verifying the operation of the chip; and Appendix 13 is layout information indicating a preliminary placing of the elements of the ASIC chip.

Appendix 14 is a program listing for a Motorola 68HC11K1 microcontroller useful in the module.

Appendices 15–32 are listings of computerized manufacturing instructions for various layers and other portions of a printed circuit board; and Appendices 33–42 are JEDEC files for programming GALs.

As a matter of practicality, these appendices will not appear as part of the printed patent, but remain as part of the application file.

DETAILED DESCRIPTION OF PREFERRED EMBODIMENTS

Figure 1:
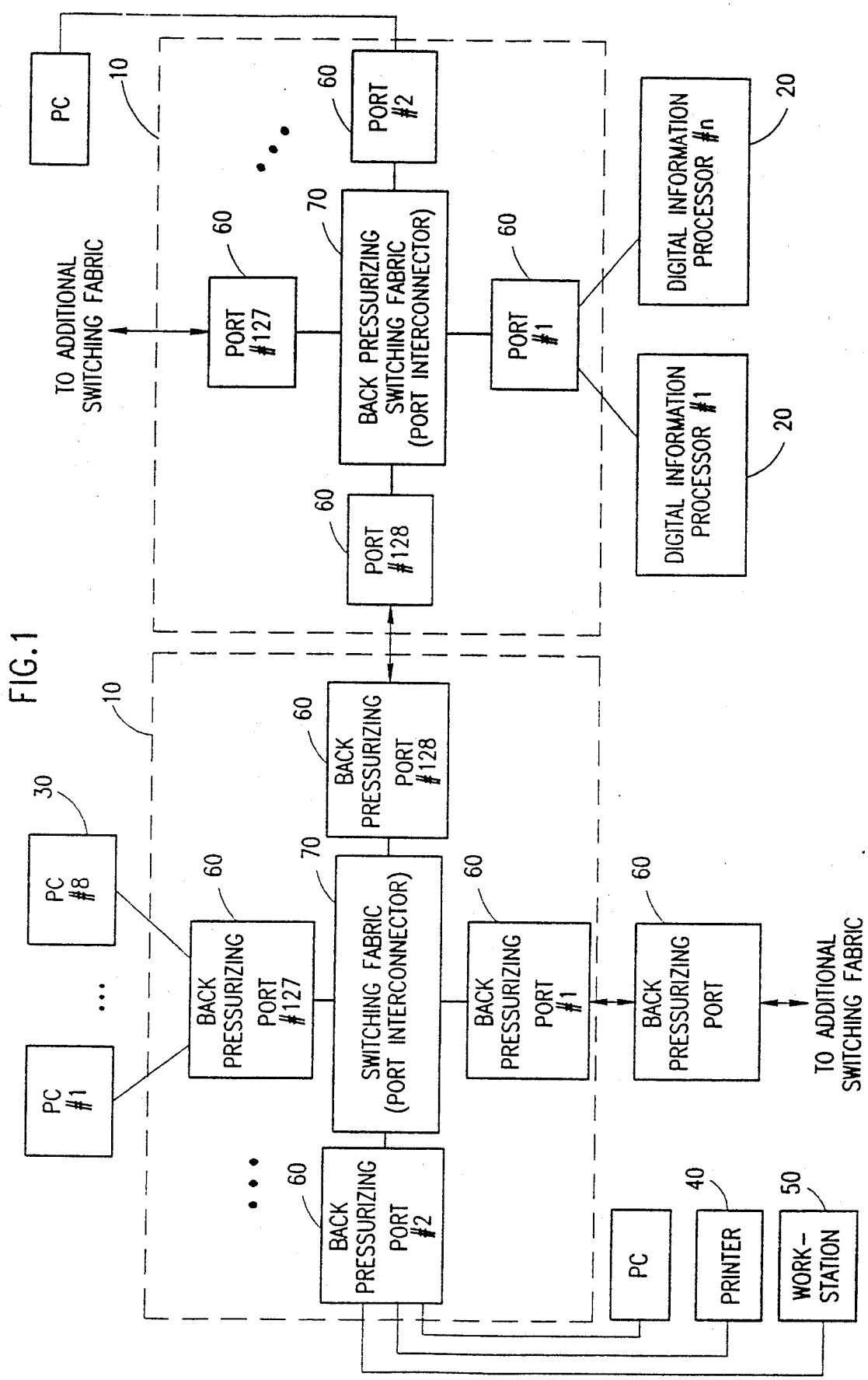
FIG. 1 is a simplified functional block diagram of a plurality of interconnected communication switching systems 10 which are each constructed and operative in accordance with a preferred embodiment of the present invention.

Reference is now made to FIG. 1 which is a simplified functional block diagram of a plurality of interconnected communication switching systems 10 which are each constructed and operative in accordance with a preferred embodiment of the present invention. Each system 10 typically interfaces with and provides communication between a multiplicity of digital information processors 20 such as but not limited to PC's 30, printers 40 and workstations 50. Alternatively or in addition, each system 10 may interface with one or more similar systems 10 as shown.

Each switching system 10 typically includes a plurality of ports 60, each of which is connected to one or more of the digital information processors 20. The plurality of ports 60 are interconnected through a switching fabric 70, also termed herein a "port interconnector".

It is a particular feature of the present invention that, when an overflow of information arrives from one or more digital information processors 20 which flow toward a common element such as an individual port 60 or the switching fabric 70, an overflow indication is provided to the digital information processor/s which flow toward the common element.

According to one preferred embodiment of the present invention, the ports 60 each comprise back pressurizing ports which implement the above overflow indication providing feature. Alternatively, the switching fabric 70 may comprise a back pressurizing switching fabric which implements the above overflow indication providing feature.

It is appreciated that, commonly, conventional digital information processors are operative to refrain from transmitting information when they encounter a traffic congestion symptom. Accordingly, the back pressurizing port or back pressurizing switching fabric of the present invention is preferably operative to artificially generate an occurrence of the traffic congestion symptom.

For example, in Ethernet and in the IEEE 802.3 protocol, the associated digital information processor only transmits information over the communication link (e.g. the communication link to a corresponding port, in FIG. 1) if it does not sense a carrier signal. If a carrier signal is sensed, no information is transmitted. Accordingly, the back pressurizing port or back pressurizing switching fabric of the present invention is preferably operative to transmit an artificial "carrier signal" to the offending digital information processor.

In the present specification, the term "carrier signal" is intended to include any type of signal which indicates to a digital information processor receiving the carrier signal that there is traffic and that, therefore, no information should be transmitted at the present time.

Figure 2:
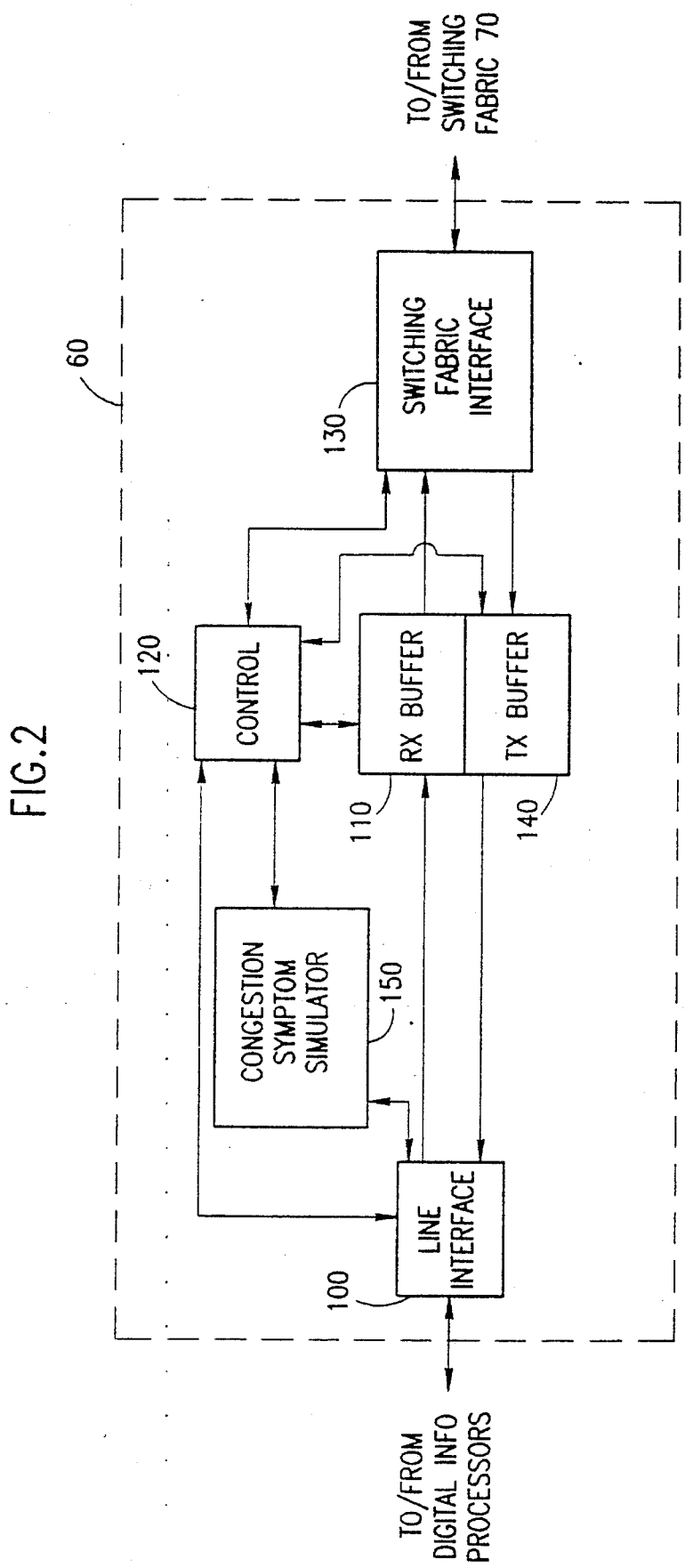
FIG. 2 is a simplified block diagram of an individual one of ports 60.

Reference is now made to FIG. 2 which is a simplified block diagram of an individual one of ports 60.

The port 60 preferably includes a line interface 100 which receives and transmits information from and to the digital information processors. The line interface 100 preferably carries out all information processor-switching system interface operations such as regulating use of the transmission line between the system and the information processor, interpretation of data and extracting clocks from data, all during reception, as well as converse operations during transmission to the information processors.

A received information buffer 110 stores information received from the digital information processors via the line interface 100 until it can be dealt with by controller 120. According to a first preferred embodiment of the present invention, an entire unit of data, such as an entire packet or an entire cell, is received from the digital information processors and stored in RX buffer 110 before the unit of data is forwarded by controller 120 to a switching fabric interface 130. Alternatively, data is transferred to the switching fabric interface 130 as it is received in which case the RX buffer 110 is only employed to stored data which cannot be transferred due, typically, to congestion at the switching fabric interface.

The switching fabric interface 130 performs all necessary interface operations in order to transmit and receive data from the back-pressurizing port 60 to the switching fabric 70 and vice versa.

A TX buffer 140 is provided which stores information being transferred from the switching fabric interface 130 to the digital information processors via line interface 100. Typically, information is transferred as soon as it is received unless there is congestion at the line interface 100. Alternatively, however, an entire data unit, such as a packet or cell, is accumulated in the TX buffer before being transferred to the line interface 100.

A congestion symptom simulator 150 is operative to simulate a symptom of congestion which is transferred to the digital information processors via the line interface 100, thereby to prevent the processors from transmitting any more information until the congestion situation is alleviated. For example:

a. In Ethernet or IEEE 802.3 applications, a carrier is transmitted to the digital information processors. The carrier may, for example, comprise a square wave of frequency 5 MHz transmitted for 1.8 msec, followed by a 5.6 microsec pause, and then followed by the square wave again, and so on.

If a digital information processor initiates transmission during one of the pauses, this occurrence is dealt with the same as an occurrence of collision, which eventuality is dealt with in the IEEE 802.3 protocol.

Preferably, the carrier is discontinued if information arrives from the switching fabric interface which is intended for the digital information processors whose transmission it is desired to block. In this case, the information is allowed to reach the digital information processor, via TX buffer 140 and the line interface since transmission of genuine information to the digital information processor is effective in blocking transmission from the processor. Once all the information has reached the processor, and if the port 60 is still congested, transmission of the carrier signal is renewed.

b. In Token Ring applications (IEEE 802.5), the processors and the port to which they are linked belong to a Ring which shares a single token. Each processor only transmits when it is in possession of the token. In this case, the congestion symptom simulator 150 prevents the processors from ever obtaining a token while congestion of the port exists. This is typically done by utilizing the priority system. The processors only obtain a token when their own priority is greater than or equal to the token's priority. Therefore, the processors' ability to gain the token can be eliminated by giving the token a priority level, such as priority level 7, which exceeds the priority level of all of the processors.

The operation of all units of the port 60 are controlled by a controller 120. The controller is responsible for:

a. Monitoring transfer of information from the line interface 100 into the RX buffer, from the RX buffer onto the switching fabric interface 130, from the switching fabric interface 130 onto the TX buffer and from the TX buffer onto the line interface; and b. Selectively activating congestion symptom simulation by the simulator 150. A preferred method for selective activation of congestion symptom simulation is now described with reference to FIG. 3.

Figure 3:
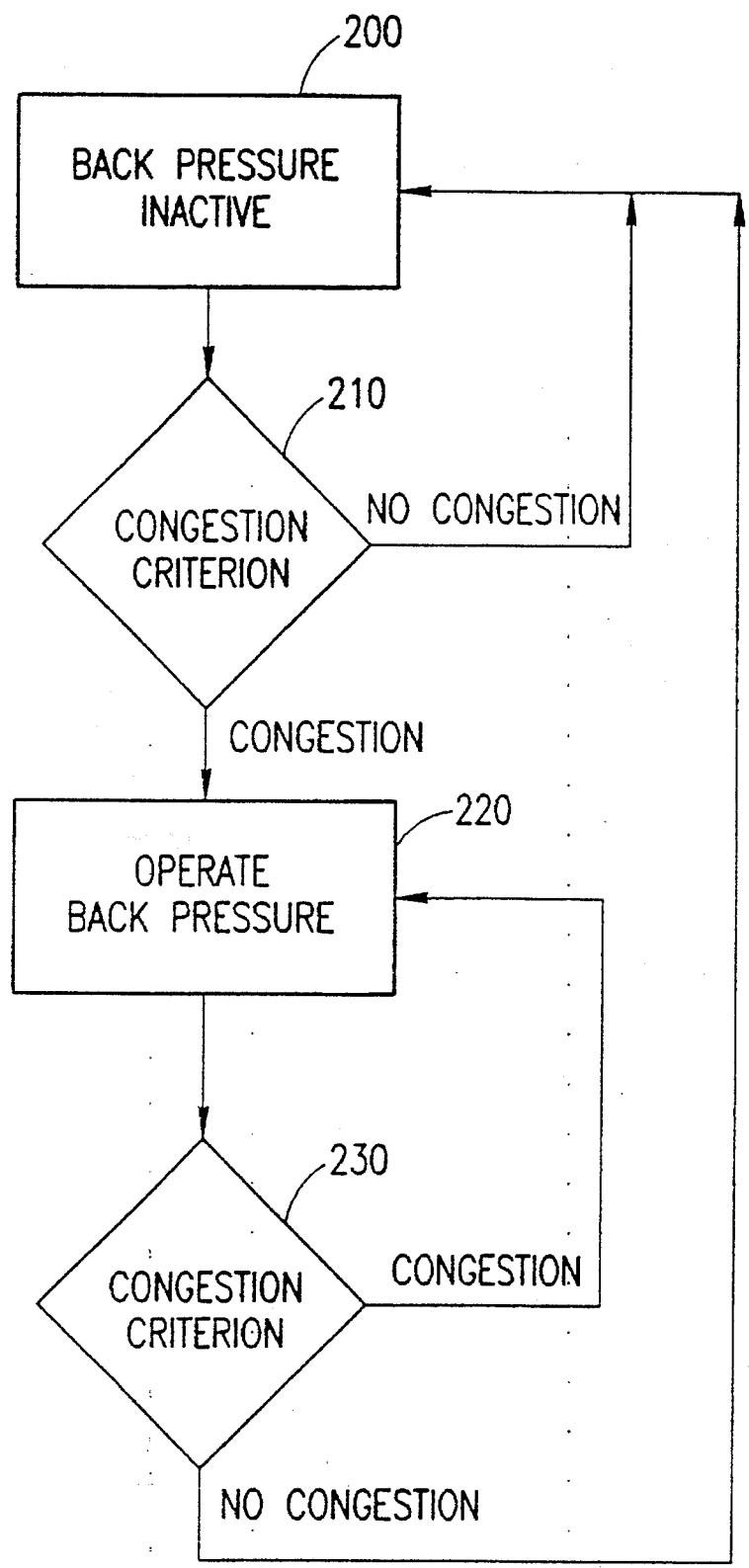
FIG. 3 is a simplified flowchart of a preferred method for selective activation of congestion symptom simulation.

FIG. 3 is a simplified flowchart of a preferred method for selective activation of congestion symptom simulation. The method of FIG. 3 preferably includes the following steps:

STEP 200: Initially, the back pressurizing function is not activated. In the illustrated embodiment, this is implemented by deactivation of the congestion symptom simulator 150.

STEP 210: A congestion criterion is inspected. For example, the criterion may be whether or not there is a predetermined amount of space left in the RX buffer 110. If the congestion criterion is not satisfied, return to step 200. If the congestion criterion is satisfied (STEP 220), operate the back pressurizing function, or, in other words, activate congestion symptom simulator 150.

STEP 230: A congestion criterion is inspected. For example, the criterion may be whether or not there is a predetermined amount of space left in the RX buffer 110. If the congestion criterion is satisfied, return to step 220. If the congestion criterion is not satisfied, return to step 200.

A very detailed description of a preferred method for constructing a communication switching module constructed and operative in accordance with one preferred embodiment of the present invention is as follows:

a. Elements U70–U73 of the module each comprise a first ASIC chip, also termed herein "MTR", which is generated as follows:
  i. Generate digital UNIX files whose contents is the contents of the listings of Appendices 1 to 5, except that the first line of each page should be ignored. One file should be generated for Appendix 3. One file should be generated for each of the three pages of Appendix 1. A plurality of files should be generated for Appendices 2 and 4 as indicated by the pagination thereof. Two files, named "15a4170s.bdcmd" and "15a4170s.cfun" should be generated for Appendix 5 as indicated by the pagination of Appendix 5. Editing software suitable for the Sun workstation may be employed to generate these digital files.
  ii. Set up a LSI Logic working environment on a Sun workstation.
  iii. Initialize the working environment using the three files generated using Appendix 1, which may be named "setuproj.dat", "LCB007.CELLIBS" and "M_T_R.OPTSPEC".
  iv. Install the LSI memory library specified by the RAM information of Appendix 3.
  v. Purchase from LSI Logic a Cellbase 1 micron ASIC using a LCB7050P die in a 160PQFP package designed in accordance with Appendices 1–3 and 5. Use the test vectors of Appendix 4 for verification.

b. Element U14 of the module comprises a second ASIC chip, also termed herein "MBLI", which is generated as follows:
  i. Generate digital UNIX files whose contents is the contents of the listings of Appendices 6 to 9, except that the first line of each page should be ignored. One file should be generated for Appendix 7. One file should be generated for each of the two pages of Appendix 6. A plurality of files should be generated for Appendix 8, as indicated by the pagination thereof. Two files, named "MBLI_IO_PINS.BDCMD" and "MBLI_IO_PINS.BLOCKS" should be generated for Appendix 9 as indicated by the pagination of Appendix 9. Editing software suitable for the Sun workstation may be employed to generate these digital files.
  ii. Set up a LSI Logic working environment on a Sun workstation.
  iii. Initialize the working environment using the two files generated using Appendix 6, which may be named "setuproj.dat", and "MBLI_IO_PINS.OPTSPEC".
  iv. Purchase from LSI Logic a Cellbase GATE ARRAY ASIC using a L100073P die in a 208PQFP package designed in accordance with Appendices 6, 7 and 9. Use the test vectors of Appendix 8 for verification.

c. Elements U41 and U39 of the module each comprise a third ASIC chip, also termed herein "MPR", which is generated as follows:
  i. Generate digital UNIX files whose contents is the contents of the listings of Appendices 10 to 13, except that the first line of each page should be ignored. One file should be generated for Appendix 11. One file should be generated for each of the two pages of Appendix 10. A plurality of files should be generated for Appendix 12 as indicated by the pagination thereof. Two files, named "L5A4124.bdcmd" and "mpr.cfun" should be generated for Appendix 13 as indicated by the pagination of Appendix 13. Editing software suitable for the Sun workstation may be employed to generate these digital files.
  ii. Set up a LSI Logic working environment on a Sun workstation.
  iii. Initialize the working environment using the two files generated using Appendix 10, which may be named "setuproj.dat" and "L5A4124.OPTSPEC".

iv. Purchase from LSI Logic a GATE ARRAY ASIC using a L100066P die in a 144PQFP package designed in accordance with Appendices 10, 11 and 13. Use the test vectors of Appendix 12 for verification.

c. Generate 18 DOS files from the listings of Appendices 15–32 respectively. The file names should be as follows:

Appendix 15—424L10G.LGR
Appendix 16—424L1G.LGR
Appendix 17—424L2G.LGR
Appendix 18—424L3G.LGR
Appendix 19—424L4G.LGR
Appendix 20—424L5G.LGR
Appendix 21—424L6G.LGR
Appendix 22—424LGG.LGR
Appendix 23—424L7G.LGR
Appendix 24—424L8G.LGR
Appendix 25—424L9G.LGR
Appendix 26—424DG.LGR
Appendix 27—424EG.LGR
Appendix 28—424FG.LGR
Appendix 29—UN424A.APR
Appendix 30—UN424A.DRL
Appendix 31—UN424A.MFG
Appendix 32—424LHG.LGR d. Purchase a printed circuit manufactured in accordance with the 18 DOS files generated in step c, from a printed circuit manufacturer such as Diceon Electronics Inc., 18522 Von Karman, Irvine, Calif. 92714, U.S.A.

e. Generate a DOS file from the listing of Appendix 14 and program a 32K×8, 120 nanosec EPROM (code 27C256-120), using a suitable programming device such as a Data I/O Model 2900, commercially available from Data I/O Corporation, POB 97046, Redmond, Wash., 98072–9746, U.S.A.

f. Generate JEDEC files in accordance with the listings of Appendices 33–42. Use these 10 files to program 10 respective GALs of the following types:

Appendices 33—40: GAL 22V10B-10
Appendix 41: GAL 16V8-15
Appendix 42: GAL 6001.

g. Purchase the off-the-shelf elements listed in the following partlist:

| Description | Reference | | Manufacturer | Manufacturer Item |
|---|---|---|---|---|
| CER 1 nF 50V 10% X7R SMD 1206 | C264,265,268 C287,290,294 | C274,279,283 C299,302,306 | AUCERA AVX KEMET SIEMENS VITRAMON | 12062R102K500BL 12065C102KAT00J C1206C102K5RAC B37872-K5102-K62 VJ1206Y102KXAT |
| CER 10 nF 50V 10% X7R SMD 1206 | C263,266,269 C286,291,295 | C275,278,282 C298,303,307 | AUCERA AVX KEMET SIEMENS VITRAMON | 12062R103K500BL 12065C103KAT00J C1206C103K5RAC B37872-K5103-K62 VJ1206Y103KXAT |
| CER 100 nF 50V 10% X7R RADIAL 2.5 mm | C29,30 | | AVX KEMET VITRAMON | SR205C104KAATR C320C104K5R5CA VP32BY104KAT |
| CER 100 nF 50V 10% X7R SMD 1206 | C105–107,112 C158,159,404 C2–8,81,82 C277,281,285 C304,308,50 C36–40,44–48 C405 C411–417,400 C551–561,721 C700–703,119 C722,110,262 C87,116,109 C95,96,170 | C120–155,161 C162–166,101 C267,270,276 C292,296,297 C32,33,35,1 C402,43,550 C41,42,11–28 C51,52,54,55 C60,64–66,77 C706–710,157 C78–79,68,69 C91–93,104, | AUCERA AVX KEMET SIEMENS VITRAMON | 12062R104K500BL 12065C104KAT00J C1206C104K5RAC B37872-K5104-K62 VJ1206Y104KXAT |
| CER 150 pF 50V 10% COG SMD 1206 | C100 C83–86,97–99 | C56–59,70–73 | AUCERA AVX KEMET SIEMENS VITRAMON | 1206CG151K500BL 12065A151KAT00J C1206C151K5GAC B37871-K5151-K62 VJ1206A151KXAT |
| CER 33 pF 50V 10% COG SMD 1206 | C259–261,273 C288,289,293 | C280,284 C300,301,305 | AUCERA AVX KEMET SIEMENS VITRAMON | 1206CG330K500BL 12065A330KAT00J C1206C330K5GAC B37871-K5330-K62 VJ1206A330KXAT |
| CER 68 pF 50V 10% COG SMD 1206 | R380–385,387 R398–407,409 R415–418,421 R432–441,443 R664 | R388–396,656 R410–413,657 R422–430,414 R444–449,379 | AUCERA AVX KEMET SIEMENS VITRAMON | 1206CG680K500BL 12065A680KAT00J C1206C680K5GAC B37871-K5680-K62 VJ1206A680KXAT |
| ELEC 100 uF 16V RADIAL 2K Hrs 5.5*12.5 mm 2 mm | C9,271,272 | | NIC COMP NICHICON NIPPON C | NRSS101M16V5*11 UVR1C101MDA-1TD SMG16VB-100(M) |
| CONN RJ-45 * 4 PORT 8/8 R.H. PCB SHIELDED | P1–8 | | STEWART | SS-668804SANF |
| CONN DIN 32PIN*3/96 MALE R.A. PCB | J1,2 | | AMPHENOL SIEMENS | C133714A96P V42254B1300C960 |
| CONN 15PIN*4 FEAMLE | J3 | | LITTON | 9151HS27500-246 |

-continued

| Description | Reference | | Manufacturer | Manufacturer Item |
|---|---|---|---|---|
| R.A. PCB | | | | |
| CONN STRIP 2PIN*1 MALE STRAIGHT PCB | JMP1,7,10 | | KCC<br>MOLEX | 1100S-2G<br>90120-0762 |
| COMM. 10BASE-T FILTER + CMC & RES. 60PIN QUAD | FL1,2 | | VALOR | FL1057-002 |
| TANTALUM 10 uF 16V 10% SMD SIZE C | C10,31,49,53 C90,94,34 | C63,67,76,80 | AVX<br>KEMET<br>SIEMENS | TAJC106K016R<br>T491C106K016AS<br>B45196-B3106-K9 |
| TANTALUM 4.7 uF 16V 10% SMD SIZE B | C111,113–115 | C117,118 | AVX<br>KEMET | TAJB475K016R<br>T491B475K016AS |
| DIODE SWITCHING 4n 0.2A SMD CASE SOD-80 1N4151/M | D20–35,37 | | ITT<br>PHILIPS | LL4151<br>PMLL4151 |
| DIODE SCHOTTKY 1.0A 40V T.H. CASE DO-41 | D18 | | PHILIPS | BYV10-40 |
| FILTER WOUND BEADS EMI/RFI | CMC9 | | FAIR-RIT | 2961666631 |
| FUSE 12.0 A 32V F T.H. | RFUSE1 | | LITTELFU | 251012. OR 255012. |
| FUSE 4.0 A 125V F T.H. | RFUSE2 | | LITTELFU | 251004. OR 255004. |
| IC 26LS32B QUAD DIFFERE. LINE RECEIVER SOIC 16PIN | U55,51,47,43 | | AMD | AM26LS32BSC |
| IC 68HC11K4 uCONTROLLER 8bit PLCC 84PIN SMD | U26 | | MOTOROLA | XC68HC11K1CFN4 |
| IC LM35 TEMP. SENSOR CASE to-92 3PIN | U32 | | N.S.C | LM35DZ |
| IC 88915T 100 MHz PLL PLCC 28PIN SMD | U20 | | MOTOROLA | MC88915TFN100 |
| IC VOLTAGE REF. 2.5V SOIC 8PIN SMD | U27 | | MOTOROLA | MC1403D |
| IC 7705A SENSING UNDER VOLT 4.6V SOIC BPIN SMD | U25 | | T.I. | TL7705ACD |
| INDUCTOR TOROID CHOKE 150uHy 3A | L1 | | R.A.M. | R1181 |
| LOGIC 74AC00 SOIC 14PIN 150MILL SMD | U103,105 | | HARRIS<br>MOTOROLA<br>N.S.C<br>T.I.<br>TOSHIBA | CD74AC00M 96<br>MC74AC00D R2<br>74AC00SC X<br>SN74AC00D R<br>TC74AC00FN ELP |
| LOGIC 74AC04 SOIC 14PIN 150MILL SMD | U23,108 | | HARRIS<br>MOTOROLA<br>N.S.C<br>T.I.<br>TOSHIBA | CD74AC04M 96<br>MC74AC04D R2<br>74AC04SC X<br>SN74AC04D R<br>TC74AC04FN ELP |
| LOGIC 74AC05 SOIC 14PIN 150MILL SMD | U74,77 | | HARRIS<br>MOTOROLA<br>TOSHIBA | CD74AC05M 96<br>MC74AC05D R2<br>TC74AC05FN ELP |
| LOGIC 74AC08 SOIC 14PIN 150MILL SMD | U79,87,109 | | HARRIS<br>MOTOROLA<br>N.S.C<br>T.I.<br>TOSHIBA | CD74AC08M 96<br>MC74AC08D R2<br>74AC08SC X<br>SN74AC08D R<br>TC74AC08FN ELP |
| LOGIC 74AC157 SOIC 16PIN 150MILL SMD | U104 | | HARRIS<br>MOTOROLA<br>N.S.C<br>T.I.<br>TOSHIBA | CD74AC157M 96<br>MC74AC157D R2<br>74AC157SC X<br>SN74AC157D R<br>TC74AC157FN ELP |
| LOGIC 74AC374 SOIC 20PIN 300MILL SMD | U59,58 | | MOTOROLA<br>N.S.C<br>T.I.<br>TOSHIBA | MC74AC374DW R2<br>74AC374SC X<br>SN74AC374DW R<br>TC74AC374FW ELP |
| LOGIC 74AC86 SOIC 14PIN 150MILL SMD | U49,48,45,44 | U57,56,53,52 | HARRIS<br>MOTOROLA<br>N.S.C<br>T.I.<br>TOSHIBA | CD74AC86M 96<br>MC74AC86D R2<br>74AC86SC X<br>SN74AC86D R<br>TC74AC86FN ELP |
| LOGIC 74ACT04 SOIC 14PIN 150MILL SMD | U2,1,33,18 | | HARRIS<br>MOTOROLA<br>N.S.C<br>T.I. | CD74ACT04M 96<br>MC74ACT04D R2<br>74ACT04SC X<br>SN74ACT04 D |
| LOGIC 74ACT08 SOIC 14PIN 150MILL SMD | U101 | U19,24,100, | HARRIS<br>MOTOROLA<br>N.S.C<br>TOSHIBA | CD74ACT08M 96<br>MC74ACT08D R2<br>74ACT08SC X<br>TC74ACT08FN ELP |
| LOGIC 74ACT32 SOIC 14PIN 150MILL SMD | U102,40 | | HARRIS<br>MOTOROLA<br>N.S.C<br>T.I.<br>TOSHIBA | CD74ACT32M 96<br>MC74ACT32D R2<br>74ACT32SC X<br>SN74ACT32 D<br>TC74ACT32 FN |
| LOGIC 74ACT74 SOIC | U15 | | HARRIS | CD74ACT74M 96 |

-continued

| Description | Reference | Manufacturer | Manufacturer Item |
|---|---|---|---|
| 14PIN 150MILL SMD | | MOTOROLA | MC74ACT74D R2 |
| | | N.S.C | 74ACT74SC X |
| | | TOSHIBA | TC74ACT74 FN |
| LOGIC 74F125 SOIC 14PIN 150MILL SMD | U10,11,9,111 | MOTOROLA | MC74F125D R2 |
| | | N.S.C | 74F125SC X |
| | | PHILIPS | N74F125D |
| | | T.I. | SN74F125D X |
| LOGIC 74HC04 SOIC 14PIN 150MILL SMD | U88 | GOLDSTAR | GD74HC04D |
| | | HARRIS | CD74HC04M 96 |
| | | MOTOROLA | MC74HC04AD R2 |
| | | N.S.C | MM74HC04M X |
| | | PHILIPS | PC74HC04T |
| | | SGS-THOM | M74HC04M1 |
| | | T.I. | SN74HC04D R |
| LOGIC 74HC157 SOIC 16PIN 150MILL SMD | U64,65 | HARRIS | CD74HC157M 96 |
| | | N.S.C | MM74HC157M X |
| | | PHILIPS | PC74HC157T |
| | | T.I. | SN74HC157D R |
| LOGIC 74HC174 SOIC 16PIN 150MILL SMD | U22 | HARRIS | CD74HC174M 96 |
| | | MOTOROLA | MC74HC174AD R2 |
| | | N.S.C | MM74HC174M X |
| | | PHILIPS | PC74HC174T |
| | | T.I. | SN74HC174D R |
| LOGIC 74HC259 SOIC 16PIN 150MILL SMD | U69,68,60 | HARRIS | CD74HC259M 96 |
| | | MOTOROLA | MC74HC259D R2 |
| | | N.S.C | MM74HC259M X |
| | | PHILIPS | PC74HC259T |
| | | T.I. | SN74HC259D R |
| | | TOSHIBA | TC74HC259AFN ELP |
| LOGIC 74HC74 SOIC 14PIN 150MILL SMD | U54,50,46,42 | HARRIS | CD74HC74M 96 |
| | | MOTOROLA | MC74HC74AD R2 |
| | | N.S.C | MM74HC74AM X |
| | | PHILIPS | PC74HC74T |
| | | T.I. | SN74HC74D R |
| | | TOSHIBA | TC74HC74AFN ELP |
| LOGIC 74HC85 SOIC 16PIN 150MILL SMD | U34 | HARRIS | CD74HC85M 96 |
| | | MOTOROLA | MC74HC85D R2 |
| | | N.S.C | MM74HC85WM X |
| | | PHILIPS | PC74HC85T |
| | | T.I. | SN74HC85D R |
| LOGIC 74HCT4040 SOIC 16PIN 150MILL SMD | U106 | HARRIS | CD74HCT4040M 96 |
| | | PHILIPS | PC74HCT4040T |
| LOGIC 74HCT74 SOIC 14PIN 150MILL SMD | U83 | HARRIS | CD74HCT74M 96 |
| | | MOTOROLA | MC74HCT74AD R2 |
| | | N.S.C | MM74HCT74M X |
| | | PHILIPS | PC74HCT74T |
| LOGIC 74ACT16245 SOIC 48PIN 300MILL SMD | U28,31,82,81 | N.S.C | 74ACTQ16245 QC |
| | | T.I. | 74ACT16245 DL |
| LOGIC 74HC123 SOIC 16PIN SMD DONT USE TOSHIBA ! | U66,63,62 | HARRIS | CD74HC123M 96 |
| | | N.S.C | MM74HC123AM X |
| | | PHILIPS | PC74HC123T |
| | | T.I. | SN74HC123D |
| LOGIC 74FCT16646AT SSOP 56PIN 300MILL SMD | U6,8,7,8,4,3 | IDT | IDT74FCT16646ATPV |
| MEMORY SRAM 8K*8 100n SOP 28PIN SMD | U29 | EPSON | SRM2264LM10 |
| | | HITACHI | HM6264ALFP-10 |
| JUMPER 2.54 mm GOLD INSULATED BLACK | JMP5,6 | PRECI-DI | 999-11-210-10 |
| JUMPER SHUNT 1POSITION BLACK | | PRECI-DI | 999-19-210-00 |
| JUMPER 7.62 mm GOLD INSULATED BLACK FOR CMC1–CMC8 | | PRECI-DI | 999-11-230-10 |
| LED HOLDER GREEN T-1 | D9 | IDEA | G61B/G |
| LED HOLDER 2xGREEN T-1 | D1–8,10–17 | IDEA | G78B/2G |
| ASIC MPR | U41,39 | LSI | L5A4124 |
| ASIC MBLI | U14 LSI | | L5A4169 |
| ASIC MTR | U70–73 LSI | | L5A4170 |
| NUT HEX M2.5 SST FOR J1-2 | | PALBOREG | NA4402500 |
| OSCILLATOR TTL 16.0 MHz 50PPM 40/60 10n H.SIZE | X1 | MODERN E | HXO-51B-16M |
| | | RALTRON | CO13-50-16M-N |
| | | SHOWA | MCO8050B-16M |
| OSCILLATOR TTL 80.0 MHz 50PPM 40/60 6n H.SIZE | X2 | DALE | XO-52A-59-80MHz |
| | | MODERN E | HXO-52B-80M |
| | | RALTRON | CO13-50-80M-N |
| | | SHOWA | MCO8050B-80M |
| NET BUSSED 10 KOHM*19 | RN4,2,8,9 | BOURNS | 4820P-002-103 |

-continued

| Description | Reference | | Manufacturer | Manufacturer Item |
|---|---|---|---|---|
| 0.08W SOIC 220 20PIN NET BUSSED 1 KOHM*19 | RN5 | | BOURNS | 4820P-002-102 |
| 0.08W SOIC 220 20PIN NET BUSSED 1 KOHM*15 | RN6 | | BECKMAN | 628B-102-G-TR4 |
| 0.08W SOIC 220 16PIN | | | BOURNS | 4816P-002-102 |
| | | | DALE | SOMC16-01-102-G |
| NET BUSSED 10 KOHM*15 | RN1,3,7 | | BECKMAN | 628B-103-G-TR4 |
| 0.08W SOIC 220 16PIN | | | BOURNS | 4816P-002-103 |
| | | | DALE | SOMC16-01-103-G |
| RESISTOR 0 OHM ⅛W | R192,193,223 | R224,229,230 | BOURNS | CR1206-J-W-000-E |
| 5% SMD 1206 | R261,262,730 | R267,268,732 | DRALORIC | CR1206-L-000-J-G4 |
| | R299,300,83 | R305,306,309 | KOA | RK73-K2B-TD-000-J |
| | R310,314,312 | R318-320,323 | ROHM | MCR18-EZHU-J-W-000 |
| | R324,327-329 | R332,474-494 | SAMSUNG | RC3216J-000-CS |
| | R340,335-337 | R343-345 | TY-OHM | RMC-0 OHM |
| | R736,182,183 | R737,78-80 | | |
| RESISTOR 10 OHM ⅛W | R550 | | BOURNS | CR1206-J-W-100-E |
| 5% SMD 1206 | | | DRALORIC | CR1206-L-100-J-G4 |
| | | | KOA | RK73-K-2B-TD-10-J |
| | | | ROHM | MCR18-EZHU-J-W-100 |
| | | | SAMSUNG | RC3216J-100-CS |
| | | | TY-OHM | RMC-10 OHM |
| RESISTOR 10K ⅛W | R100-116,130 | R127-129,99 | BOURNS | CR1206-J-W-103-E |
| 5% SMD 1206 | R131-133,139 | R137,138,4,5 | DRALORIC | CR1206-L-103-J-G4 |
| | R140-141,136 | R145-147,126 | KOA | RK73-K2B-TD-10K-J |
| | R150-155,450 | R175,164,213 | ROHM | MCR18-EZHU-J-W-103 |
| | R202,251,240 | R28,689-691 | SAMSUNG | RC3216J-103-CS |
| | R289,278,144 | R29-33,564 | TY-OHM | RMC-10 KOHM |
| | R359,360,679 | R36,66,67,70 | | |
| | R451-455,88 | R495,34,76 | | |
| | R685,40,35 | R71,41,682 | | |
| | R738,739,747 | R8,9,11-26 | | |
| | R89-93,686 | | | |
| RESISTOR 150K ⅛W | R348-353 | | BOURNS | CR1206-JW-154-E |
| 5% SMD 1206 | | | DRALORIC | CR1206-L-154-J-G4 |
| | | | KOA | RK73-K-2BTD-150K-J |
| | | | ROHM | MCR18-EZHU-J-W-154 |
| | | | SAMSUNG | RC3216J-154-CS |
| | | | TY-OHM | RMC-150 KOHM |
| RESISTOR 18K ⅛W | R161,162,166 | R173,199,200 | BOURNS | CR1206-JW-183-E |
| 5% SMD 1206 | R204,211,237 | R238,242,249 | DRALORIC | CR1206-L-183-J-G4 |
| | R275,276,280 | R287 | KOA | RK73-K-2B-TD-18K-J |
| | | | ROHM | MCR18-EZHU-JW-183E |
| | | | SAMSUNG | RC3216J-183-CS |
| | | | TY-OHM | RMC-18 KOHM |
| RESISTOR 1K ⅛W | R117-124 | R158,159,170 | BOURNS | CR1206-JW-102-E |
| 5% SMD 1206 | R171,196,197 | R208,209,234 | DRALORIC | CR1206-L-102-J-G4 |
| | R235,246,247 | R272,273,284 | KOA | RK73-K-2B-TD-1K-J |
| | R285,148,149 | | ROHM | MCR18-EZHU-J-W-102 |
| | | | SAMSUNG | RC3216J-102-CS |
| | | | TY-OHM | RMC-1 KOHM |
| RESISTOR 1M ⅛W | R94 | | BOURNS | CR1206-JW-105-E |
| 5% SMD 1206 | | | DRALORIC | CR1206-L-105-J-G4 |
| | | | KOA | RK73-K-2B-TD-1M-J |
| | | | ROHM | MCR18-EZHU-J-W-105 |
| | | | SAMSUNG | RC3216J-105-CS |
| | | | TY-OHM | RMC-1 MOHM |
| RESISTOR 270 OHM ⅛W | R156,157,168 | R169,194,195 | BOURNS | CR1206-JW-271-E |
| 5% SMD 1206 | R206,207,232 | R233,244,245 | DRALORIC | CR1206-L-271-J-G4 |
| | R270,271,282 | R283 | KOA | RK73-K-2B-TD-270-J |
| | | | ROHM | MCR18-EZHU-J-W-271 |
| | | | SAMSUNG | RC3216J-271-CS |
| | | | TY-OHM | RMC-270 OHM |
| RESISTOR 2K ⅛W | R160,163,167 | R172,198,201 | BOURNS | CR1206-JW-202-E |
| 5% SMD 1206 | R205,210,236 | R239,243,248 | DRALORIC | CR1206-L-202-J-G4 |
| | R274,277,281 | R286 | KOA | RK73-K-2B-TD-2K-J |
| | | | ROHM | MCR18-EZHU-J-W-202 |
| | | | SAMSUNG | RC3216J-202-CS |
| | | | TY-OHM | RMC-2 KOHM |
| RESISTOR 33 OHM ⅛W | R56-61,74,75 | | BOURNS | CR1206-JW-330-E |
| 5% SMD 1206 | | | DRALORIC | CR1206-L-330-J-G4 |
| | | | KOA | RK73-K-2B-TD-33-J |
| | | | ROHM | MCR18-EZHU-J-W-330 |
| | | | SAMSUNG | RC3216J-330-CS |
| | | | TY-OHM | RMC-33 OHM |
| RESISTOR 330 OHM ⅛W | R63 | | BOURNS | CR1206-JW-331-E |
| 5% SMD 1206 | | | DRALORIC | CR1206-L-331-J-G4 |
| | | | KOA | RK73-K-2B-TD-330-J |

-continued

| Description | Reference | | Manufacturer | Manufacturer Item |
|---|---|---|---|---|
| | | | ROHM | MCR18-EZHU-J-W-331 |
| | | | SAMSUNG | RC3216J-331-CS |
| | | | TY-OHM | RMC-330 OHM |
| RESISTOR 4.7K ⅛W | R458 | R688,687,457 | BOURNS | CR1206-JW-472-E |
| 5% SMD 1206 | R735 | R95–98,125 | DRALORIC | CR1206-L-472-J-G4 |
| | | | KOA | RK73-K-2BTD-4.7K-J |
| | | | ROHM | MCR18-EZHU-J-W-472 |
| | | | SAMSUNG | RC3216J-472-CS |
| | | | TY-OHM | RMC-4.7 KOHM |
| RESISTOR 47 OHM ⅛W | R72,73 | | BOURNS | CR1206-JW-470-E |
| 5% SMD 1206 | | | DRALORIC | CR1206-L-470-J-G4 |
| | | | KOA | RK73-K-2B-TD-47-J |
| | | | ROHM | MCR18-EZHU-J-W-470 |
| | | | SAMSUNG | RC3216J-470-CS |
| | | | TY-OHM | RMC-47 OHM |
| RESISTOR 470K ⅛W | R62 | | BOURNS | CR1206-JW-474-E |
| 5% SMD 1206 | | | DRALORIC | CR1206-L-474-J-G4 |
| | | | KOA | RK73-K-2BTD-470K-J |
| | | | ROHM | MCR18-EZHU-J-W-474 |
| | | | SAMSUNG | RC3216J-474-CS |
| | | | TY-OHM | RMC-470 KOHM |
| RESISTOR 510 OHM ⅛W | R165,174,176 | R177,203,212 | BOURNS | CR1206-JW-511-E |
| 5% SMD 1206 | R214,215,241 | R250,252,253 | DRALORIC | CR1206-L-511-J-G4 |
| | R279,288,290 | R291,37 | KOA | RK73-K-2B-TD-511-J |
| | | | ROHM | MCR18-EZHU-J-W-511 |
| | | | SAMSUNG | RC3216J-511-CS |
| | | | TY-OHM | RMC-510 OHM |
| RESISTOR 820 OHM ⅛W | R178–181,216 | R187,188 | BOURNS | CR1206-JW-821-E |
| 5% SMD 1206 | R217–219,254 | R222,228,260 | DRALORIC | CR1206-L-821-J-G4 |
| | R255–257,292 | R266,298,304 | KOA | RK73-K-2B-TD-820-J |
| | R293–295 | | ROHM | MCR18-EZHU-J-W-821 |
| | | | SAMSUNG | RC3216J-821-CS |
| | | | TY-OHM | RMC-820 OHM |
| RESISTOR 5.1 OHM ¼W | R184,186,190 | R191 | BOURNS | CR1206-J-W-5R1-E |
| 5% SMD 1206 | R220,225,226 | R231,258,263 | DRALORIC | CR1206-L-5R1-J-G4 |
| | R264,269,296 | R301,302,307 | ROHM | MCR18-EZHU-J-W-5R1 |
| | | | SAMSUNG | RC3216J-5R1-CS |
| | | | TY-OHM | RMCQ-5.1 OHM |
| SCREW PHILL M2.5*10 P/H SST FOR J1-2 | | | PALBOREG | DF1402510 |
| SOCKET DIP 28PIN PCB | U30 | | DSM | 630-28-CC-D-1 |
| 4.50 mm 600mill | | | NEXTRON | 100-286-10-1003 |
| | | | PRECI-DI | 110-91-628-41-001 |
| | | | SOCKET E | SE06-28-2TG |
| SOCKET PLCC 20PIN SMD | | | AMP | 822014-3 |
| 4.70 mm | | | PRECI-DI | 540-99-020-07-400 |
| FOR U12 | | | | |
| SOCKET PLCC 28PIN SMD | U107 | U16,17,84,85 | AMP | 822039-3 |
| 4.70 mm | | | PRECI-DI | 540-99-028-07-400 |
| FOR U35–38 | | | | |
| SWITCH ACCESSORY KNOB GREY FOR SW2 | | | ELMA | 210-8301 |
| SWITCH ACCESSORY CAP GREY FOR SW2 | | | ELMA | 300-8011 |
| SWITCH DIP SPST 6# STRAIGHT PCM | SW1 | | GRAYHILL | 78B06 |
| SWITCH CODED BCD 2# R.A. PCM | SW2 | | ELMA | BV17114 |
| WIRE HOOK-UP PVC 30AWG 300V 80C BLACK FOR U27 | | | BELDEN | 9930-10 |

End of Report h. Assemble the parts listed in the above partlist onto the printed circuit board of step d, by matching the printed labels on the printed circuit board to the reference column of the partlist. The following instructions should preferably be followed:
1. Use jumpers to short legs 1-8, 2-7, 3-6, 4-5, of CMC1–CMC8.
2. Make the following patches, using wire-wrap black wire, 30 AWG, on the print side between:
U27(8)–U27(1)
U27(7)–U27(2)
U27(6)–U27(6)
U74(10)–U109(1)
U106(1)–U74(11)
J1B(10)pad–U74(10)
3. Connect the resistor RS-85-4.7K between resistor's R11 pad and J1B(10).
4. Disconnect the following legs: U74(11), U109(1).
5. Disconnect the wire which routed to U107(17) prior to socket insertion.

Notes:

The resistor should not stand out from the print side.

The resistor leg which is connected to the pad should have Teflon isolation.

The following parts should remain unassembled: Component side:
1. U78,75,200,90,91,110,21,61
2. C600,500,466
3. R500,501,681,683,677,678,743,744,666,134,135,189, 185,227
   R221,265,259,303,297,731,745,733
4. D19,36
5. L2
6. TP1–9, 11–13
7. JMP8,9
8. CON1,2,4–6

Print side:
1. C160,169,168
2. R634,635,470–473,466–469,50,51,665,668,321,700–703
   R354–357,313,308,311,315,318,316,317,322,330,331, 326,325,
   R333,334,338,339,346,347,342,341,48,49,46,47,675,42, 43,54,
   R55,81,82,600,601,44,45,65,69,64,68,635,634,671,672, 673,669
   R748,742,741,674,496,10
3. D50

The EPROM of step e should be inserted into the U26 socket.

The 10 GALs programmed in accordance with Appendices 33–42 should be inserted into the following sockets, respectively:
Appendix 33: U85
Appendix 34: U36
Appendix 35: U38
Appendix 36: U35
Appendix 37: U37
Appendix 38: U84
Appendix 39: U17
Appendix 40: U16
Appendix 41: U12
Appendix 42: U107.

The assembled board is preferably used with LET 36/20 HUBS, commercially available from Lannet Data Communications Ltd., Tel Aviv, Israel.

Figure 4:
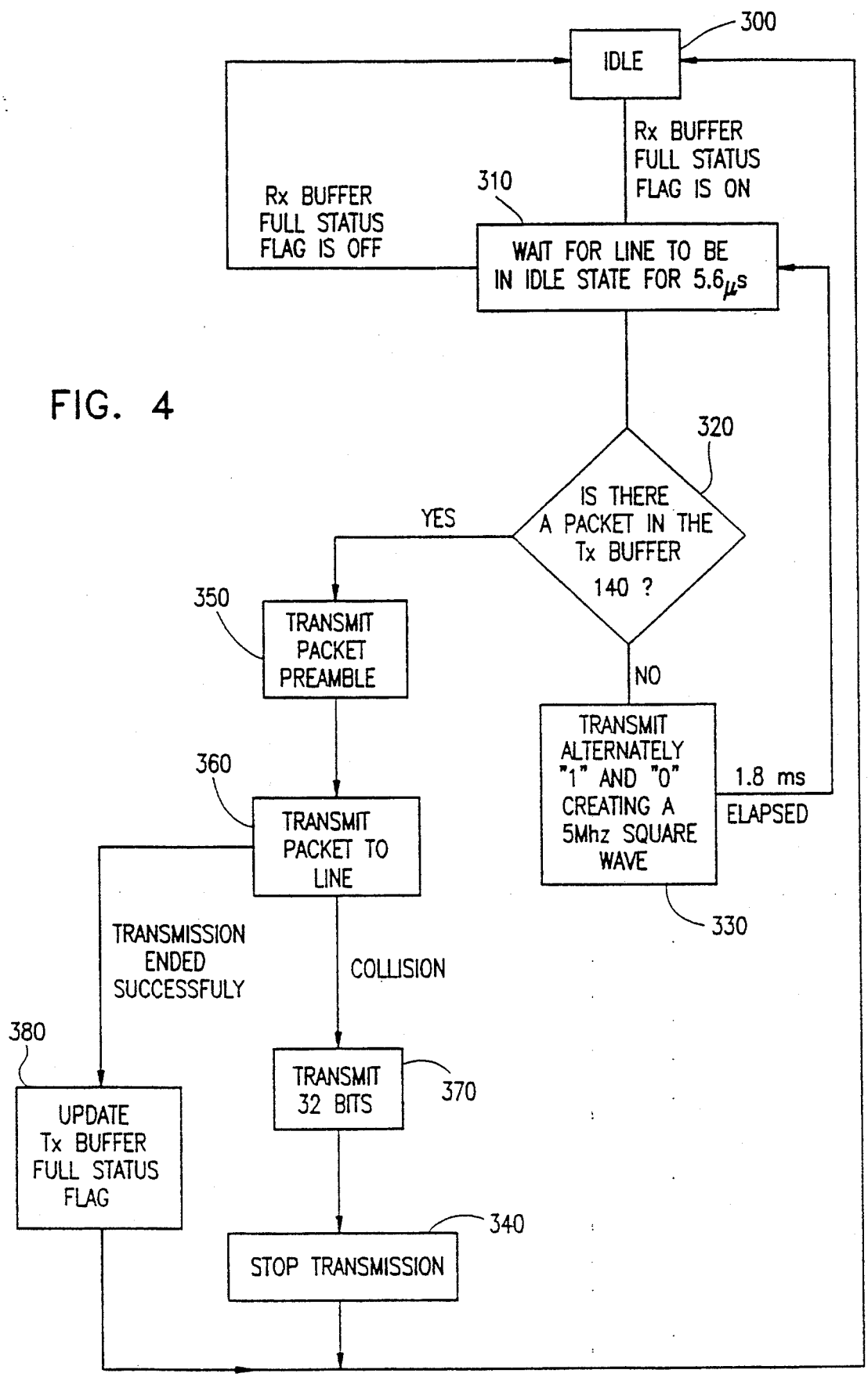
FIG. 4 is a simplified flowchart illustration of a preferred method by which a back-pressurizing port of FIG. 1 generates back-pressure by simulating traffic on a line connecting elements 30 and 60 or 50 and 60.
Figure 5:
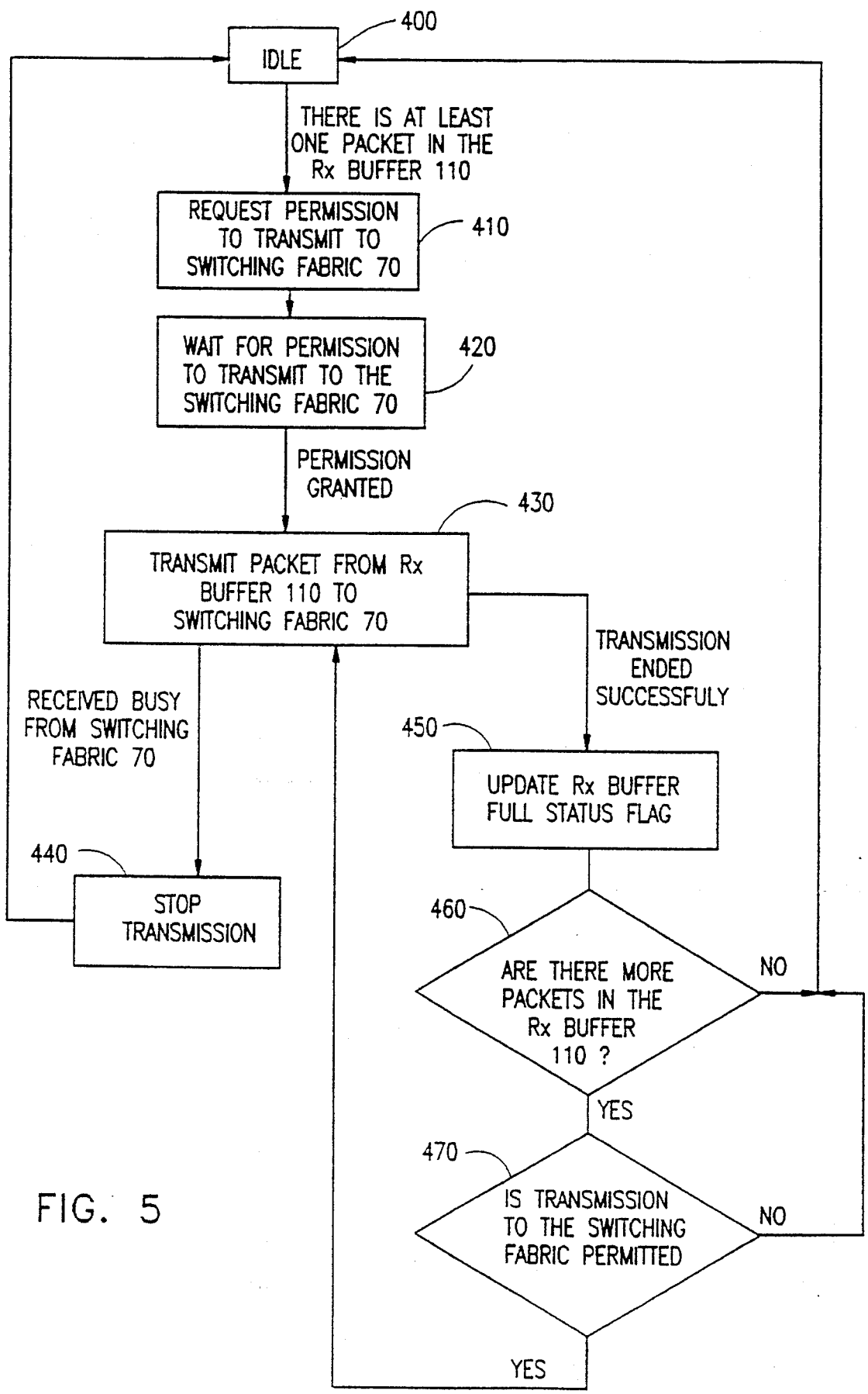
FIG. 5 is a simplified flowchart illustration of a preferred method by which the RX buffer full flag of FIG. 4 is updated as a result of a port sending packets to the switching fabric.
Figure 6:
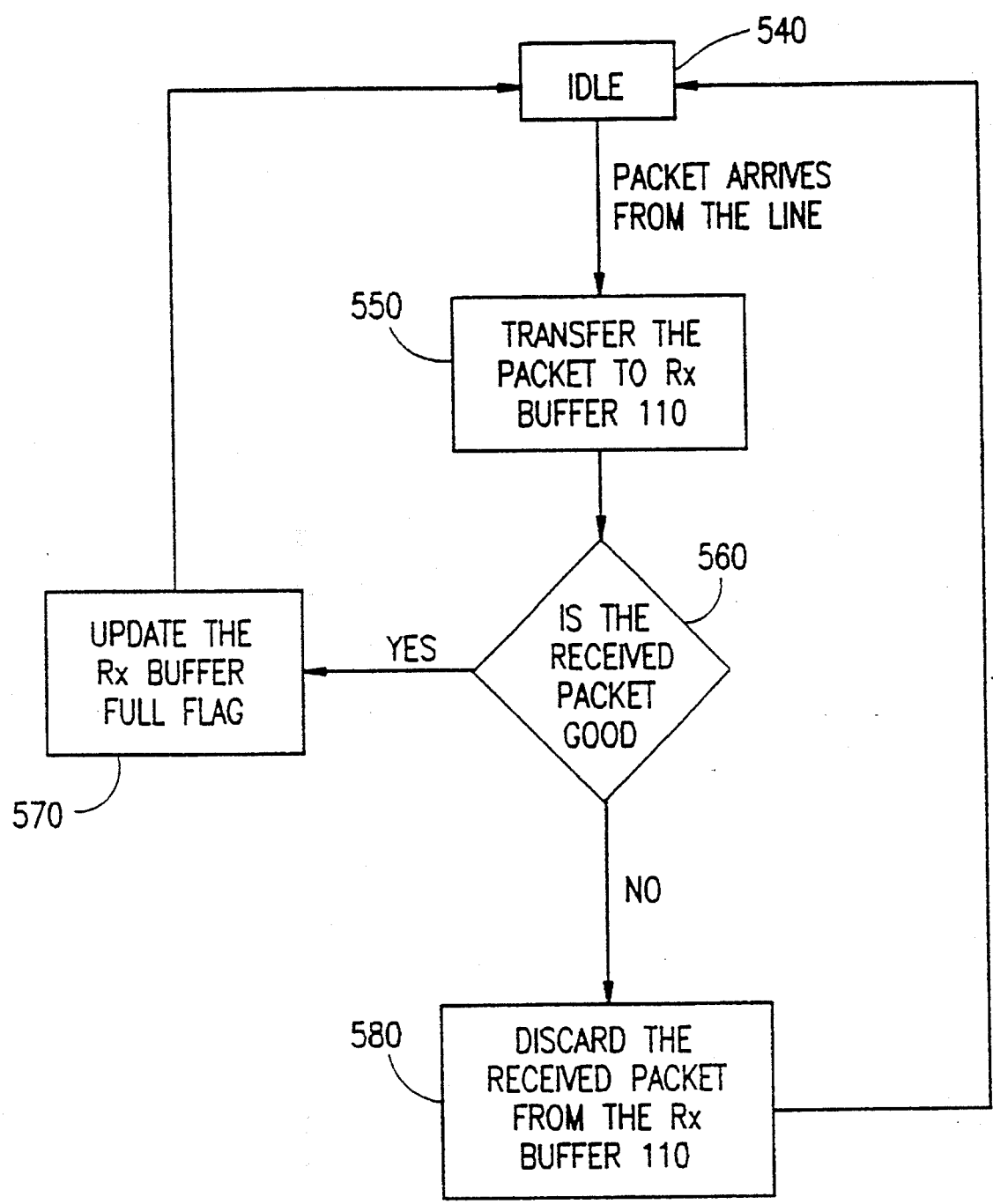
FIG. 6 is a simplified flowchart illustration of a preferred method by which the RX buffer full flag of FIG. 4 is updated as a result of a port receiving packets from digital information processors.

FIG. 4 is a simplified flowchart illustration of a preferred method by which a back-pressurizing port of FIG. 1 generates back-pressure by simulating traffic on a line connecting elements 30 and 60 or 50 and 60;

FIG. 5 is a simplified flowchart illustration of a preferred method by which the RX buffer full flag of FIG. 4 is updated as a result of a port sending packets to the switching fabric; and FIG. 6 is a simplified flowchart illustration of a preferred method by which the RX buffer full flag of FIG. 4 is updated as a result of a port receiving packets from digital information processors.

All of the steps in the flowchart illustrations of FIGS. 4–6 are fully disclosed in the description of a preferred implementation of the present invention which appears on page 12, third complete paragraph on to the paragraph bridging pages 33 and 34 and which makes reference to Appendices 1–42 described in the Brief Description section of this specification. The components which chiefly implement each of the steps of FIGS. 4–6 are as follows:

Steps 320, 380, 430, 440, 450, 460, 560, 570 and 580 of the flowcharts of FIGS. 4–6 are implemented chiefly in the component described in paragraph a on page 12.

Steps 300, 340, 360, 540 and 550 of the flowcharts of FIGS. 4 and 6 are implemented chiefly in the components described in paragraph a on page 12, paragraph b on page 13 and paragraph c on page 14. All three of these components are initialized by a microprocessor termed U26 on the partlist on page 19 (second part from the bottom of page 19). The code for the U26 microprocessors is provided in the listing of Appendix 14 as described in paragraph e on page 15.

Steps 400, 410, 420 and 470 of the flowchart of FIG. 5 are implemented chiefly in the components described in paragraph a on page 12 and paragraph b on page 13.

Steps 330, 350 and 370 of the flowchart of FIG. 4 are implemented chiefly in the components described in paragraph b on page 13 and paragraph c on page 14.

Step 310 of the flowchart of FIG. 4 is implemented chiefly in the component described in paragraph b on page 13.

All of the above components are mounted on a printed circuit board described on page 15 in paragraphs c and d.

It is appreciated that the chips described above with reference to the Appendices are intended only to provide an extremely detailed disclosure of a sample embodiment of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. Communication switching apparatus for providing LAN communication among a multiplicity of digital information processors, each said processor conventionally including an activity detector operative to cause the processor to refrain from transmitting information onto a medium when the activity detector encounters a symptom of activity on said medium, the switching apparatus including:

a plurality of ports each communicating with at least one of the digital information processors via said medium;

a LAN port interconnector interconnecting at least two of said plurality of ports; and an overflow indicator, sensing overflow at at least one of:
the LAN port interconnector; and
at least one of the plurality of ports;

the switching apparatus being characterized in that the overflow indicator, upon sensing said overflow, provides an artificially generated symptom of activity to at least one said activity detector.

2. Apparatus according to claim 1 wherein said symptom comprises LAN traffic.

3. Apparatus according to claim 1 wherein said LAN port interconnector comprises an Ethernet interconnector.

4. Apparatus according to claim 1 wherein said LAN port interconnector comprises a Token Ring interconnector and wherein said symptom of activity comprises inability to obtain a token.

5. Apparatus according to claim 1 wherein said LAN port interconnector comprises an IEEE 802.3 standard interconnector.

6. Apparatus according to claim 1 wherein each individual port includes an information overflow sensor and indicator operative to sense an overflow and operative to provide an overflow indication to the digital information processors communicating with the individual port.

7. Apparatus according to claim 1 wherein said LAN port interconnector comprises an IEEE 802.5 standard interconnector.

8. Apparatus according to claim 1 wherein all of said multiplicity of digital information processors are operative to refrain from transmitting information onto said medium upon encountering the symptom of activity on said medium and would otherwise transmit information.

9. A method for providing LAN communication among a multiplicity of digital information processors, each said processor conventionally including an activity detector operative to cause the processor to refrain from transmitting information onto a medium when the activity detector encounters a symptom of activity on said medium, the method including:

providing a plurality of ports each communicating with at least one of the digital information processors via said medium;

providing a LAN port interconnector interconnecting at least two of said plurality of ports; and sensing overflow at at least one of:
the LAN port interconnector; and
at least one of the plurality of ports; and upon sensing said overflow, providing an artificially generated symptom of activity to at least one said activity detector.

10. A method according to claim 9 wherein said symptom comprises LAN traffic.

11. A method according to claim 9 wherein said step of sensing overflow comprises the step of inspecting for a congestion criterion.

12. Communication switching apparatus for providing LAN communication among a multiplicity of digital information processors for which a token is defined, each said processor conventionally including a token possession detector operative to cause the processor to refrain from transmitting information onto a medium when the token possession detector detects that the processor does not possess a token, the switching apparatus including:

a plurality of ports each communicating with at least one of the digital information processors via said medium;

a LAN port interconnector interconnecting at least two of said plurality of ports; and an overflow indicator, sensing overflow at at least one of:
the LAN port interconnector; and
at least one of the plurality of ports;

the switching apparatus being characterized in that the overflow indicator includes a priority indicator which, upon sensing said overflow, elevates the token's priority such that the token possession detector of at least one of said processors detects that its processor does not possess the token.

* * * * *